(12) United States Patent
Geurts

(10) Patent No.: US 8,534,792 B2
(45) Date of Patent: Sep. 17, 2013

(54) METHOD FOR CALIBRATING AN ARRAY OF IMAGING ELEMENTS

(75) Inventor: Mathijs P. W. Geurts, Bergen (NL)

(73) Assignee: OCE Technologies B.V., Venlo (NL)

( * ) Notice: Subject to any disclaimer, the term of this patent is extended or adjusted under 35 U.S.C. 154(b) by 0 days.

(21) Appl. No.: 13/451,975

(22) Filed: Apr. 20, 2012

(65) Prior Publication Data

US 2012/0200632 A1 Aug. 9, 2012

Related U.S. Application Data

(63) Continuation of application No. PCT/EP2010/066626, filed on Nov. 2, 2010.

(30) Foreign Application Priority Data

Nov. 6, 2009 (EP) .................................... 09175257

(51) Int. Cl.
*B41J 29/393* (2006.01)

(52) U.S. Cl.
USPC ........................................................... 347/19

(58) Field of Classification Search
USPC ......... 358/483, 497, 482, 474, 494; 348/262, 348/324; 235/454; 347/19
See application file for complete search history.

(56) References Cited

U.S. PATENT DOCUMENTS

| 4,870,505 | A | * | 9/1989 | Mitsuki | 358/494 |
| 6,168,261 | B1 | | 1/2001 | Miyake et al. | |
| 6,263,117 | B1 | | 7/2001 | Lee | |
| 6,474,767 | B1 | * | 11/2002 | Teshigawara et al. | 347/19 |
| 2002/0008731 | A1 | | 1/2002 | Matsumoto et al. | |
| 2002/0165685 | A1 | | 11/2002 | Andersen et al. | |

FOREIGN PATENT DOCUMENTS

| EP | 0 024 521 B1 | | 11/1983 | | |
| WO | WO-2008013527 | * | 1/2008 | | 358/475 |
| WO | WO 2009/115855 A1 | | 9/2009 | | |

* cited by examiner

*Primary Examiner* — Julian Huffman
(74) *Attorney, Agent, or Firm* — Birch, Stewart, Kolasch & Birch, LLP

(57) ABSTRACT

For accurately calibrating an inline scanner a printer such as an inkjet printer may print a pattern, which is scanned by the inline scanner. The method is configured such that print artifacts resulting from not yet calibrated print heads do not significantly influence the calibration of the scanner. After calibration of the scanner, the print heads and the control units driving the print heads may be calibrated using the calibrated inline scanner.

14 Claims, 5 Drawing Sheets

METHOD FOR CALIBRATING AN ARRAY OF IMAGING ELEMENTS

Figure 1A:
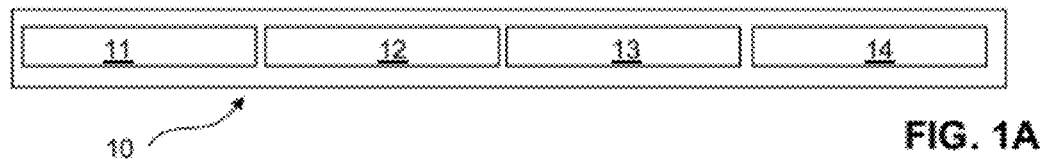

This application is a Continuation of PCT International Application No. PCT/EP2010/066626 filed on Nov. 2, 2010, which claims priority under 35 U.S.C §119(a) to Patent Application No. 09175257.6 filed in Europe on Nov. 6, 2009, all of which are hereby expressly incorporated by reference into the present application.

The present invention relates to a method of calibrating an array of a first image generated at a first imaging position and a second image generated at a second imaging position for at least partly compensating a misalignment between the first image and the second image. The present invention further relates to a device configured for performing the method.

In a Contact Image Sensor, well known as and hereinafter also referred to as a CIS-array, a number of independent imaging elements such as CCD-chips, CMOS-chips, and the like, are arranged such that each element is configured to image a part of larger field of view of the image sensor. So, after imaging the images of the respective imaging elements are stitched to form a single, larger image. Such CIS-arrays are well-known in the art and a further detailed description is omitted here.

In the above-described CIS-arrays the imaging elements are aligned such that an acceptable image quality is obtained, meaning that in the resulting larger image a junction between the images from the separate imaging elements is not visible. It is known to employ an imaging unit in an inkjet printer for measurement purposes, e.g.

for aligning a number of print heads relative to each other. Such measurement needs to be relatively accurate, since the droplets to be expelled by said print heads may be provided at a high resolution, e.g. 600 or 1200 dots per inch (dpi) which corresponds to a typical distance between two dots of about 42 or 21 micron. Hence, for good positioning of the droplets, the accuracy of the alignment of the print heads should lie in a range of 40 microns or, preferably, even higher accuracy. In order to determine such an accurate alignment, it is at least desirable, if not required, that a measurement of the alignment is performed with significantly higher accuracy. For example, the measurement accuracy may be preferred to be better than about 10 micron and more preferably better than about 4 micron (about 10 times better than the requirement alignment accuracy of the above mentioned 40 micron).

The imaging elements of a CIS-array are however not aligned with such accuracy, as above described. So, in order to use a CIS-array for measurement purposes, it is required to perform a calibration for determining a misalignment between the respective imaging elements and to at least partly compensate for such misalignment.

From the prior art, e.g. as described in U.S. Pat. No. 6,263,117, it is known to calibrate a CIS-array using a highly accurate test target. Such a test target comprises a predetermined patterned image, which image has predetermined characteristics enabling a highly accurate calibration. Based on reconstruction of the original predetermined patterned image using the predetermined characteristics, a misalignment between adjacent imaging elements may be determined. The highly accurate test target to be used in such method may be manufactured using e.g. lithographic techniques, or the like. Such highly accurate test target is as a consequence of the required specialized manufacturing techniques an expensive part. Already for this reason requiring an accurate test target is undesirable. Apart from the costs, for (re-)calibration of the CIS-array after sale of the inkjet apparatus, it would be required that a service technician carries the test target with him, which would require an expensive test target for each service technician. Further, an apparatus to be calibrated by use of the test target needs to be provided with the predetermined characteristics of the test target in order to be enabled to derive any misalignment, thereby limiting the possibilities to calibrate the apparatus.

It is an object of the present invention to provide a calibration method that does not require a highly accurate test target.

The above object is achieved in a method according to claim 1. In the method according to the present invention, a calibration target is provided and imaged by the imaging device, such as a CIS-array. A first target component is imaged by in the first image, thereby obtaining a first partial target image and a second target component is imaged in a second image, thereby obtaining a second partial target image. The first and the second target components are associated with each other. Thus, two partial target images are obtained, each having an image of a target component associated with the target component in the other partial target image.

Taking the two partial target images and analyzing them with respect to each other, in particular correlating the two target components in the respective partial target images instead of performing an image reconstruction as known from the prior art, it is enabled to determine a relative position and/or orientation of the images with respect to each other. While in the prior art method, the accuracy of the calibration depends on the accuracy of the test target, in the present invention, the accuracy depends on the accuracy of the correlation between the at least one property of each partial target images. As used herein, the term 'correlating' includes comparing and matching a corresponding property between two or more images. So, in particular, the present invention includes comparing and matching at least one property of each partial target image. Such a property could be a part of the image or could be a geometrical aspect derived from each partial target image. Other aspects that enable to compare the partial target images and enable to determine a relative position there between based on that comparison are also contemplated to be suitable for use in the present invention. In a CIS-array, a relative position and/or orientation of the (partial target) images corresponds to the relative position and/or orientation of the respective imaging elements. Having the relative position and/or orientation, the misalignment (if any) is known and may be at least partly compensated e.g. by software routines operating on the images obtained from the separate imaging elements.

In the above-described and herein-claimed method, there is no requirement on the accuracy of the calibration target itself. There may however be a requirement with respect to the association between the target component of the first partial target image and the second partial target image, since the calibration is based on associating/correlating the partial target images. Such requirement with respect to the association is hereinafter elucidated with respect to the hereinafter described detailed embodiments, each having their own specific requirements. However, as hereinafter described, in each of the embodiments, it is possible to use a common inkjet printing apparatus for providing the calibration target. So, in the above-described case in which the CIS-array is employed as a measurement device in an inkjet apparatus, it is enabled to first print the calibration target with said printing apparatus and then using the printed calibration target for calibrating the CIS-array. Consequently, the service technician is not required to always carry a calibration target with him, but he may print the calibration target when calibration appears necessary and dispose of the calibration target after use.

Moreover, using the method and means provided by the present invention, the calibration may be performed by a user or, in an embodiment, a printer may be arranged and configured to perform the calibration automatically, if the print engine and an imaging device are arranged such that a substrate on which an image is printed by the print engine is guided into the imaging device for sensing and misalignment correction. After having performed the imaging device alignment, a similar method may be performed for aligning the print heads.

It is noted that, in the above-indicated prior art, a position and/or orientation of each imaging element was determined relative to the test target. Therefore, the test target is required to be highly accurate. In the method according to the present invention, almost any target image may be employed, as the method merely compares the images of the calibration target obtained with the imaging device. Hence, the relative position and/or orientation of each image is determined with respect to another image and not relative to the calibration target. Consequently, the properties of the calibration target are basically immaterial to the method, although certain requirements may apply and preferred embodiments of a calibration target may be employed in order to obtain a better result.

In the above-mentioned embodiment using a CIS-array, the imaging device comprises a first imaging element and a second imaging element. In such an embodiment, the elements may be arranged adjacent to each other and the resulting images should be aligned adjacent to each other. In a particular embodiment of such an embodiment, the calibration target comprises at least a first calibration component to be imaged by the first imaging element, a second calibration component to be imaged by the second imaging element and a third calibration component to be partly imaged by the first imaging element and to be partly imaged by the second imaging element. From the resulting first and second partial target images, a calibration property of the first calibration component is derivable, a calibration property of the second calibration component is derivable and a third calibration property of the third calibration component is derivable. Based on the derived calibration properties relative to each other, it is enabled to determine a relative position and/or orientation of the first and the second image. Such position and/or orientation corresponds to any misalignment of the first and the second imaging elements and a corresponding misalignment parameter may be derived from the determined relative position and/or orientation. For example, an average value of the first and the second calibration properties may be determined and a difference between said average value and the third calibration property may be used to determine the relative position and/or orientation.

In another particular embodiment, the first and the second imaging positions are not aligned adjacent to each other, but they are staggered. In such an embodiment, the first and the second images each comprise at least a same part of the calibration target. Using the same part, the first and the second partial target images may be directly correlated and a relative position and/or orientation may be determined.

In another embodiment, an imaging element is moveably supported on a guide element for imaging a strip extending in a direction of the guide element. For example, the imaging element may be arranged on a carriage of an inkjet printing apparatus and be moved reciprocatingly along a platen on which a print medium may be arranged. In this embodiment, the strip is imaged by generating the first image and the second image at their respective positions, the respective positions being arranged on the strip. So, while due to the motion in the direction of the guiderail, the imaging element is enabled to generate an image at different positions, in particular positions arranged on the strip.

Since the guiderail may not be ideally straight and/or since the imaging element may image differently due to e.g. acceleration forces, the separate images may not be ideally aligned. Using the method according to the present invention, such misalignment may also be determined.

In a particular embodiment, the images generated by the imaging element are substantially adjacent to each other and the method as above-described for the embodiment comprising adjacently arranged imaging elements is basically employed. In another particular embodiment, the images generated by the imaging element are overlapping and the method as above-described for the embodiment comprising staggered imaging elements is basically employed.

In an aspect, the present invention further provides an imaging apparatus configured to perform the method according to the present invention. In an embodiment, such an imaging apparatus is provided with a print engine and is configured to print a suitable test target for use with the method according to the present invention. In a further embodiment, the print engine comprises a number of inkjet print heads, while the print engine is configured to print the test target using a single print head. The latter embodiment ensures that the test target is not deteriorated due to misalignments of the print heads, while assuming that a single print head is deemed to print stably over the printing period needed for printing the test target.

In a further aspect, the present invention provides a computer readable medium comprising computer executable instruction for instructing a computer to perform the method according to the present invention and in particular for having a computer controlled imaging apparatus performing the method.

Figure 1B:
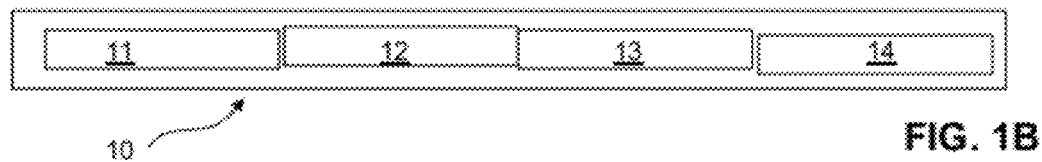
Figure 1C:
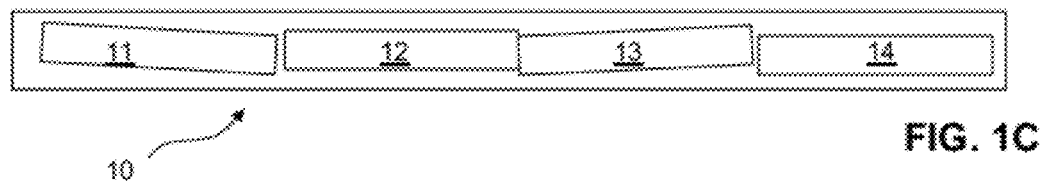
Figure 2A:
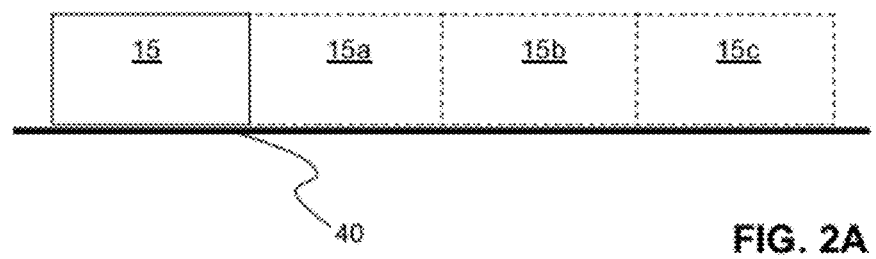
Figure 2B:
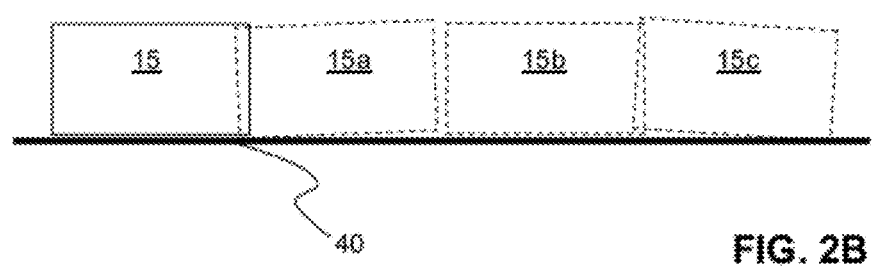
Figure 3A:
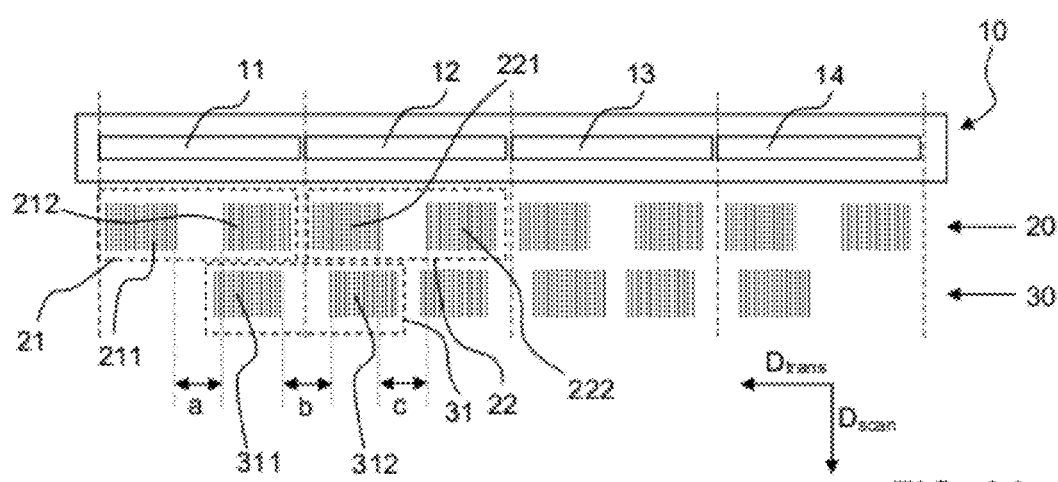
Figure 3B:
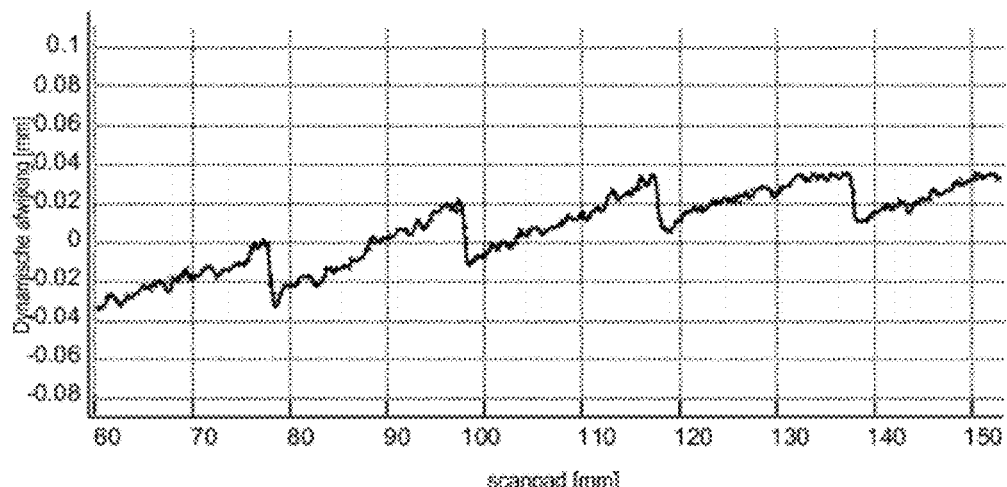
Figure 3C:
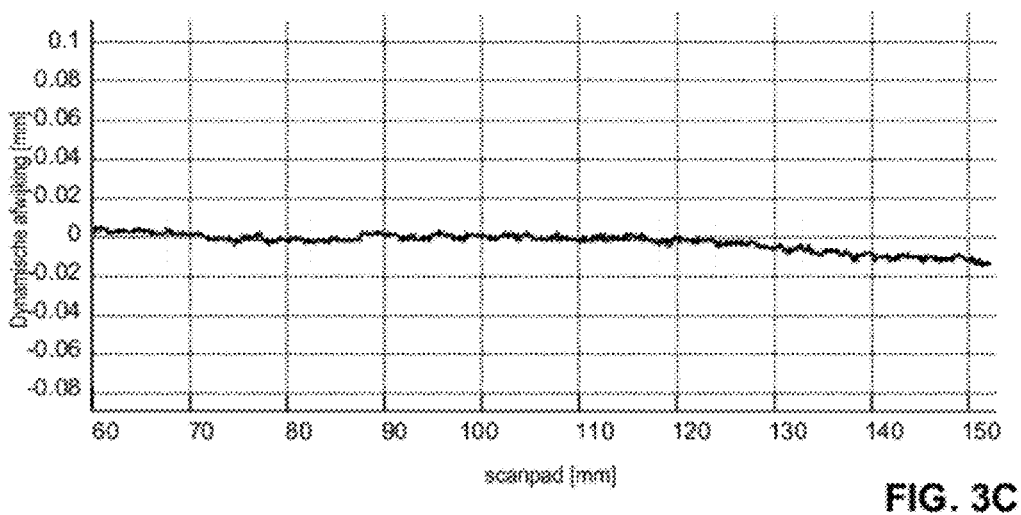
Figure 4:
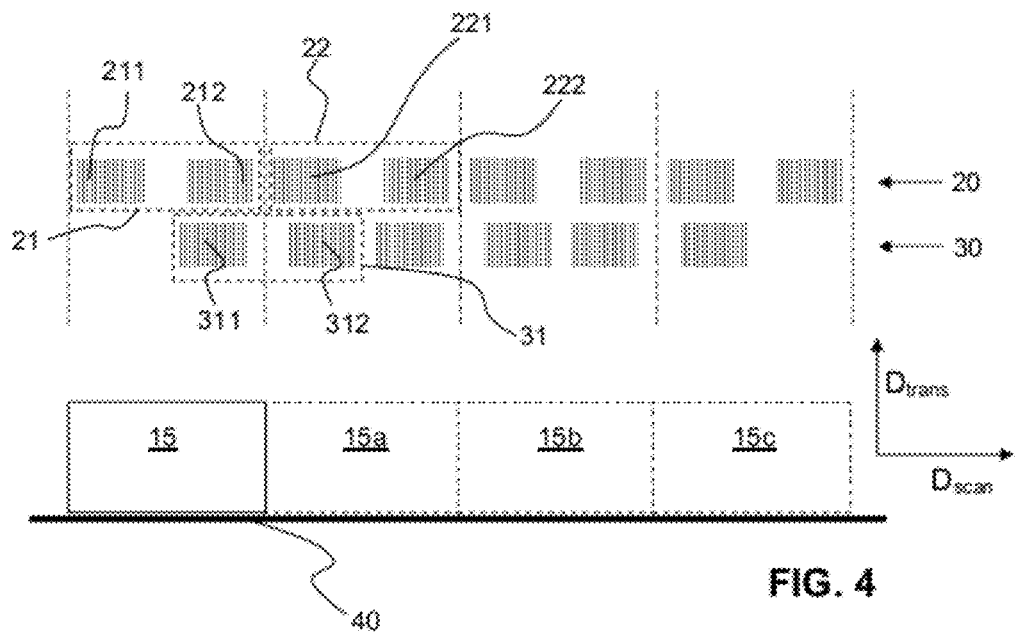
Figure 5:
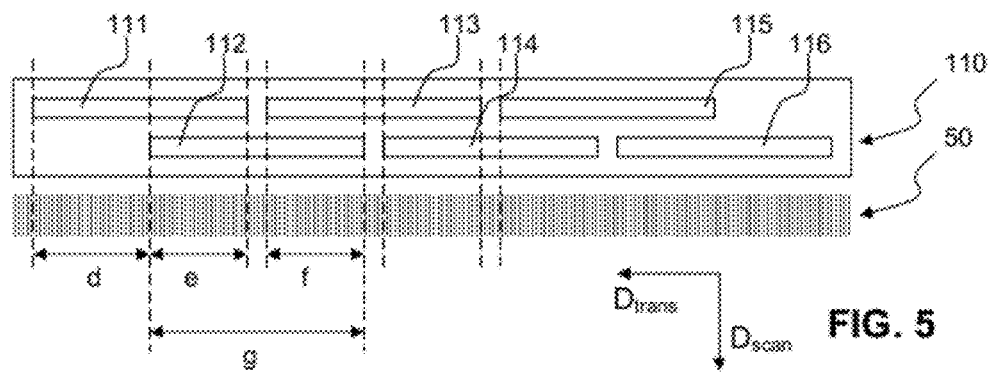
Figure 6:
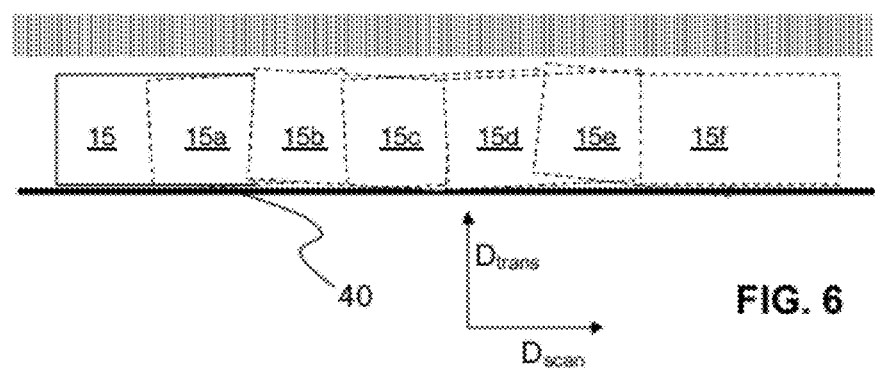
Figure 7:
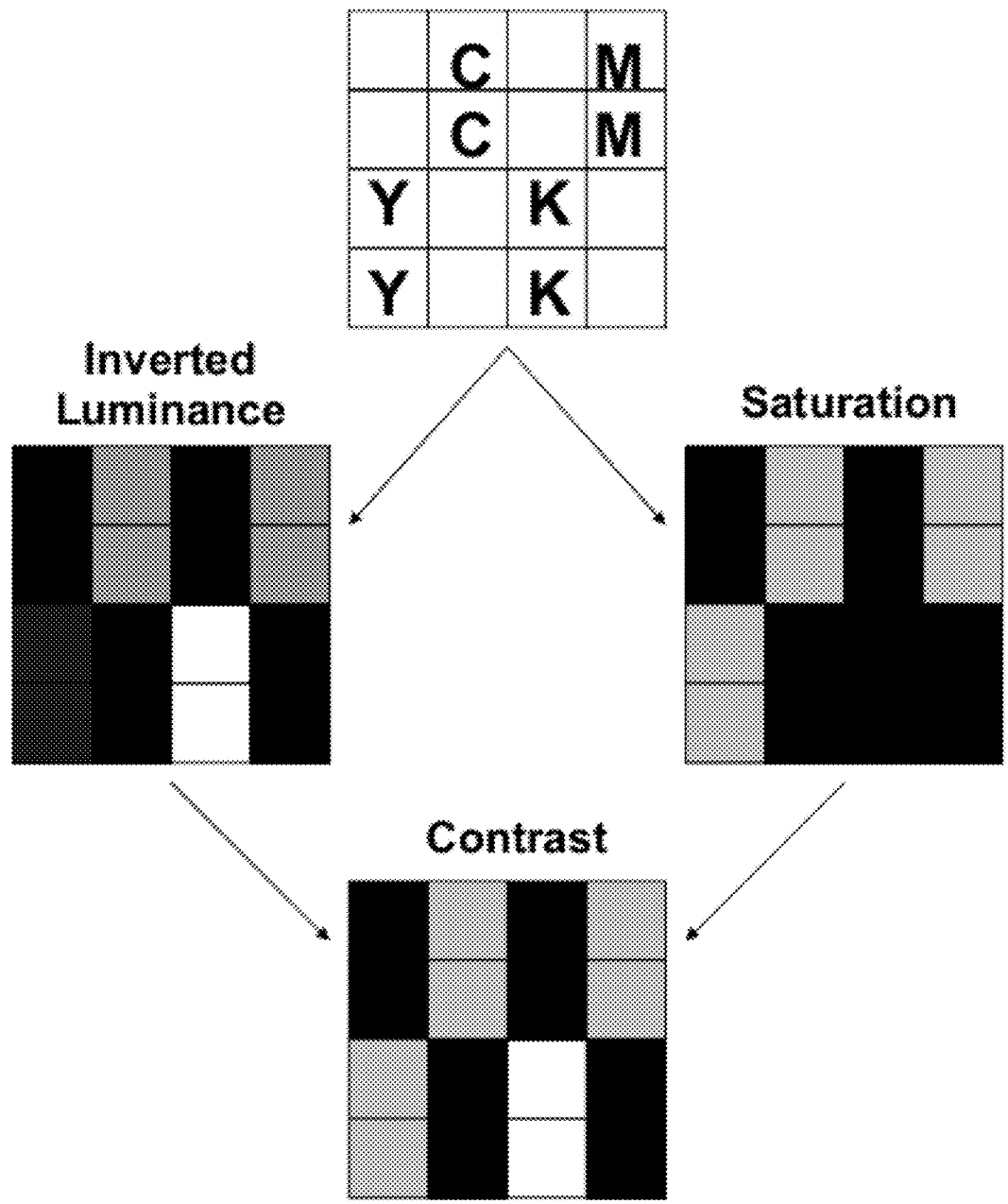

Further details, embodiments, advantages are presented hereinafter, wherein the present invention is elucidated with reference to the appended drawings showing non-limiting embodiments and wherein:

FIG. 1A-1C schematically illustrate an imaging device having a number of imaging elements;

FIG. 2A-2B schematically illustrate an imaging device moveably supported on a guide rail for scanning-wise imaging;

FIG. 3A schematically illustrates a first embodiment of a method according to the present invention;

FIG. 3B-3C illustrate a calibration result obtained with the first embodiment;

FIG. 4 schematically illustrates a second embodiment of a method according to the present invention;

FIG. 5 schematically illustrates a third embodiment of a method according to the present invention;

FIG. 6 schematically illustrates a fourth embodiment of a method according to the present invention; and FIG. 7 schematically illustrates a method for providing a high contrast image suitable for use in the method according to the present invention.

In the drawings, same reference numerals refer to same elements. FIG. 1A-1C each show an imaging device 10, e.g. a CIS array, provided with four imaging elements 11, 12, 13 and 14. The four imaging elements 11-14 are intended to be arranged such that the images generated by the respective imaging elements 11-14 stitched together form a single image. Therefore, the imaging elements 11-14 should be aligned on a straight line without any substantial spacing between adjacent imaging elements. In practice, in cost-effective imaging devices 10 of this type, the imaging elements 11-14 are aligned during manufacturing of the imaging device 10 to the extent that any misalignments are not visible to the human visual system.

If it is desired to use such an imaging device 10 of the above-mentioned type in a printing apparatus, e.g. an inkjet printing apparatus, for detecting any print artifacts, such as resulting from misaligned print heads, the accuracy of the alignment is generally insufficient. FIG. 1A-1C illustrate any misalignments that may be present.

In the imaging device 10 as illustrated in FIG. 1A, the four respective imaging elements 11-14 are all aligned such that they are arranged on a (substantially) straight line, but a spacing between respective adjacent imaging elements 11-14 may be present and the spacing may vary. In the imaging device 10 as illustrated in FIG. 1B, not only the spacing may vary, but the position of the respective imaging elements 11-14 may also deviate from the intended straight line in a direction perpendicular to said straight line. In the embodiment of the imaging device 10 as illustrated in FIG. 1C, not only the position of the respective imaging elements 11-14 deviates from the intended positions, but also the orientation (rotation) of the respective imaging elements 11-14 may deviate. These aspects of the position and orientation of the respective imaging elements 11-14, in particular relative to each other, are misalignment aspects and result in an inaccurate imaging, resulting in an inaccurate detection of any print artifacts. Hence, as disclosed in the prior art, a calibration of the imaging device 10 is required in order to enable accurate detection.

A same problem of inaccurate detection of print artifacts occurs in another embodiment, in which a single imaging element 15 may be employed. Such an embodiment is illustrated in FIG. 2A-2B. Referring to FIG. 2A, a carriage supporting an imaging element 15 is moveably arranged on a guide rail 40. In reciprocating movement, the imaging element 15 is enabled to image at a number of adjacently arranged imaging positions 15a, 15b, 15c. By stitching the images generated at the imaging positions 15a-15c, a strip-shaped image is generated. Such a method of imaging is also known from inkjet printing apparatus, in which a carriage supports a number of print heads and an imaging element, wherein the carriage is configured to reciprocate to provide droplets of ink expelled from the print heads, and/or imaging the results thereof, for example.

The guide rail 40 is generally not ideally straight and therefore, generally, the images are not aligned as intended. Referring to FIG. 2B, any deviation of the guide rail 40 with respect to the intended straightness results in a deviation of the imaging positions.

Likewise, inaccurate timing of the imaging and/or inaccurate control of movement of the carriage may result in scanning artifacts. For example, the actual imaging positions may be shifted both in the scanning direction and perpendicular to the scanning direction and the imaging positions may be rotated. Hence, the same problem as the problem resulting from an arrangement of a number of imaging elements as described in relation to FIG. 1A-1C results.

FIG. 3A illustrates an embodiment according to the present invention in which an imaging device 10 of the type shown in FIG. 1A-1C, in which the imaging elements (or at least one imaging element) extend in the medium transport direction, is examined in order to determine any misalignment between the imaging elements 11-14. Thereto, a calibration target is provided, which calibration target comprises a first target part 20 and a second target part 30. The first target part 20 comprises a first calibration component 21 and a second calibration component 22, while the second target part 30 comprises a third calibration component 31. Each calibration component 21, 22, 31 is provided with a first element 211, 221, 311, respectively, and a second element 212, 222, 312, respectively. A spacing a is present between the first element 211 and the second element 212 of the first calibration component 21. A spacing b is present between the first element 311 and the second element 312 of the third calibration component 31. A spacing c is present between the first element 221 and the second element 222 of the second calibration component 22.

The first, second and third calibration components 21, 22, 31 are provided such that the spacings a, b, c are substantially equal, while the length of the spacings a, b, c is not predetermined. Moreover, the pattern shown in FIG. 3A is arbitrary and may be a different pattern suitable for determining from a scanned image of the calibration component 21, 22, 31 a distance corresponding to the respective spacings a, b, c. The shown line pattern, for example, is suitable as it enables to derive from the scanned image a line frequency and corresponding phase of the frequency as known in the relevant art. Using this phase of the line pattern, it is enabled to determine a distance between (similar) line patterns, such as the spacing a between the first element 212 and the second element 222 of the first calibration component 21, with a relatively high accuracy compared to the accuracy of the line pattern itself. A practical result of such a determination of the phase of the line pattern using a commercially available CIS-array (cf. FIG. 1C) is illustrated in FIGS. 3B and 3C.

Referring to FIG. 3B, a phase angle at a number of positions along the CIS-array (X-axis: 'Scanpad [mm]') have been determined. The determined phase angles have been converted into relative displacements from an intended position (Y-axis: 'Dynamische afwijking [mm]'). At the positions along the CIS-array 78 mm, 98 mm, 118 mm, 138 mm a steep change in the relative displacement is present, indicating a transition between adjacent imaging elements. The steep changes are about 30 micron, corresponding to a distance between the imaging elements of about 30 micron, which optimally should have been 0 micron. Having obtained the distance between each pair of adjacent imaging elements, common image processing or other suitable processing may be performed to compensate—at least partly—such misalignment. For example, the compensation or correction may include adding (sub)pixels in the digital representation of the calibration target, but any other suitable method for correcting the misalignment may be applied. After correction, a same calculation is performed and the result thereof is shown in FIG. 3C.

Returning to FIG. 3A, a method for simply and cost-effectively obtaining the shown calibration target and a particular embodiment of a calculation method for determining the misalignment distance between the imaging elements is elucidated. First referring to the calibration target, the calibration target comprises the first target part 20 and the second target part 30. The target parts 20, 30 extend in a direction corresponding to the direction of elongation of the CIS-array 10. Now assuming that the CIS-array 10 is arranged in an inkjet printer, the direction of elongation corresponds to a recording medium transport direction Dtrans. The medium transport direction Dtrans corresponds to a direction in which a row of nozzles of a print head (not shown) extends. The print head and the CIS-array 10 are arranged to scan along the recording medium in a direction Dscan, which is substantially perpendicular to the medium transport direction Dtrans. Hence, the target parts 20, 30 extend in a direction substantially perpendicular to a direction of the row of nozzles of the print head(s).

Assuming that the print head(s) are not aligned and/or calibrated in any way, an operator who is to calibrate the inkjet apparatus needs to use the CIS-array 10 for calibrating the print heads and, preferably, as above described, he wants to use the print heads for obtaining a calibration target for calibrating the CIS-array 10. Although this appears contradictory, according to the present invention, this is enabled.

First, the CIS-array 10 is to be calibrated. Thereto, the calibration target comprising the first target part 20 and the second target part 30 is to be printed by the inkjet printer.

Considering that the print heads have not been aligned/calibrated, it is in accordance with the present invention considered that a single print head may be used, thereby avoiding artifacts in the calibration target due to misalignment of the print heads.

The print head comprises a number of nozzles arranged in a row, which row extends in the transport direction Dtrans. For printing, the print head is moved in the scanning direction Dscan. The same is applicable for the CIS-array. Considering that the row of nozzles may a same or larger length than the CIS-array, the first and the second target part may be printed in a single scanning movement of the print head. However, nozzles in the row may individually differ and corresponding errors in the measurement are inherent. In order to avoid such inter-nozzle related errors, the first target part and the second target part are not printed in a single scanning movement of the print head.

Moreover, each calibration component 21, 22, 31 is printed with the same nozzles in different swaths. So, for example, in a first swath, the second calibration component 22 is printed. Then, the print head and the recording medium are moved relative to each other over a distance substantially equal to half the length of an imaging element 11-14 and then the print head prints the third calibration component 31. Then, the print head and the recording medium are again moved relative to each other over a distance substantially equal to half the length of an imaging element 11-14 and then the print head prints the first calibration component 21. In such a method, the calibration components 21, 22, 31 are presumed to have no substantial differences. In particular, referring to the above-described method of determining the imaging element (mis-) alignment, the spacing between the lines of the first and second elements 211, 212, 221, 222, 311, 312 of the respective calibration components 21, 22, 31 and the spacing between the respective first and the second elements 211, 212; 221, 222; 311, 312 is substantially the same. The first and the second calibration components 21, 22 enable to calibrate the imaging elements 11, 12, respectively, and determine the spacing between the first and the second elements 211, 212; 221, 222, while the third calibration component 31 enables to determine any misalignment between the first and the second imaging element 11, 12.

FIG. 4 illustrates an embodiment in accordance with the embodiment of FIG. 2A-2B having an imaging element arranged on the carriage, wherein the imaging element is arranged such that a resulting image extends in the scanning direction. In such an embodiment the imaging system, including the carriage, a carriage support assembly, a carriage movement control assembly and the imaging element, may be calibrated using the method as illustrated in and described in relation to FIG. 3A-3C.

FIG. 4 shows the same calibration target as shown in FIG. 3A and which may be obtained using the above-described method. However, please note that the transport direction Dtrans and the scanning direction Dscan have been rotated over 90° compared to the situation illustrated in FIG. 3A. Hence, the calibration target may be printed in a single or a small number of swaths such that at least a part of each element of the first calibration component is printed in a single swath. In order to prevent that print artifacts that influence the calibration accuracy occur, it may be preferred that the calibration target is printed first in accordance with the above described method and be rotated manually or automatically.

Having obtained the calibration target it may be scanned by the imaging element 15, thereby obtaining images at the imaging positions 15a-15c. The imaging positions may be positioned and/or orientated incorrectly as illustrated by FIG. 2B. Using the calibration target aspects as above described in relation to FIG. 3A-3C, these misalignments of the imaging positions 15a-15c are derivable from the resulting images and therefore, in future scanned images, the misalignments may be corrected for.

In an embodiment of the present invention, there is redundancy in the imaging elements such that at least a part of a imaging position may be imaged by two separate imaging elements. Such an embodiment is illustrated in FIG. 5. FIG. 5 shows an imaging device 110 provided with six imaging elements 111-116. An imaging position g corresponding to a second imaging element 112 overlaps with an imaging position corresponding to a first imaging element 111 in a first overlapping area e and with an imaging position corresponding to a third imaging element 113 in a second overlapping area f. In the illustrated embodiment, a part of an imaging position may not be overlapping with an imaging position of another imaging element, for example (I) a part d of the imaging position of the first imaging element 111 and (II) a spacing between the first overlapping area e and the second overlapping area f.

Based on the overlapping imaging positions it is enabled to compare, e.g. by correlating, a same part of a calibration target 50 as imaged by a first imaging element and as imaged by a second imaging element. Hence, any print artifacts in the calibration target will have little influence on the calibration result. Moreover, print artifacts may be advantageously used for comparing the images of the corresponding overlapping area. The same method of comparing overlapping images may be employed in the embodiment of FIG. 2A-2B as illustrated by FIG. 6. By selecting the imaging positions 15a-15f such that they overlap, the resulting images may be compared e.g. by correlating, thereby decreasing the influence of the calibration target on the calibration accuracy.

In the above described method, an in-line scanner may be used for eventually positioning one or more print heads and/or calibrating a driver system for suitably driving one or more print heads (such calibrating for example including determining a suitable timing for droplet ejection from an ink jet print head relative to the recording medium). Consequently, the scanner needs to be able to detect patterns printed by each print head, which may include patterns of different colors, usually including the common process colors cyan, magenta, yellow and black (CMYK, respectively). Since only the position of the printed patterns is needed for calibrating, it is known to perform a black-and-white or a grayscale scanning, thereby obtaining a scan in which each pixel represents a luminance value (cf. a grayscale image).

Yellow patterns however have a relatively small difference in luminance compared to common 'white' paper. As a result a pattern printed by a print head with yellow ink on common white paper, the yellow pattern may not be sufficiently distinguishable from the paper white due to a low contrast, thereby rendering the scan unsuitable for accurately calibrating such a print head. In such a case, one may contemplate to perform a color scan, if a color scanner is provided, thereby obtaining a scan in which each pixel represents not only a luminance value, but also a color value. However, only the position is needed for calibration. Therefore, in order to obtain a simple image in which sufficient contrast is provided for enabling determining the position of the patterns, it is proposed to determine a color saturation per pixel and construct an image having pixels representing the saturation.

It is noted that black and white have no saturation. Therefore, the above proposed method may be unsuitable for distinguishing black from white. In order to obtain an image showing a black pattern, the luminance may be represented by the pixels in the image. In case all patterns (i.e. independent of the color) are desired to be represented in a single image with sufficient contrast, the images representing saturation and luminance may be combined by common image processing.

FIG. 7 illustrates an example of the above proposed method. The upper array illustrates an image comprising 16 pixels arranged in four rows and four columns. Two pixels are indicated to be cyan (C), two other pixels are magenta (M), two other pixels are yellow (Y) and two other pixels are black (K). The remaining eight pixels are not colored and hence they represent (paper) white.

As illustrated by FIG. 7, based on the original image, an inverted luminance image is generated, in which the black pixels are represented with a high pixel value (shows as white). The paper white pixels have a high luminance value and are therefore shown as black. The magenta and cyan pixels have a moderate luminance value, which is significantly lower than white. So, in the inverted luminance image, these pixels are represented by relatively light gray pixels. Since the yellow pixels have a relatively high luminance resulting in corresponding dark gray pixels in the inverted luminance image. A similar operation is performed with respect to the color saturation of each pixel. In the saturation image, the originally white pixels and black pixels are shown as black pixels, since black and white have a low saturation. The colored (CMY) pixels have a relatively high saturation, resulting in light gray pixels in the saturation image.

Then, for each set of two corresponding pixels of the inverted luminance image and the saturation image the pixel having the highest value (high value being represented by white or a light gray) is selected. For example, a yellow pixel has a high luminance, resulting in a low value in the inverted luminance image and the same yellow pixel has a high saturation value. So, in the resulting image, the highest value, in this case the saturation value is used. For a black pixel the inverted luminance value will be used. Thus, an image showing pixels having either a high saturation or a low luminance results. Such an image (in FIG. 7 indicated as the contrast image) provides sufficient contrast for each color compared to paper white for enabling an accurate calibration of all print heads. Please note that other operations like addition, averaging and the like may be used instead of the above proposed comparison and selection.

It is noted that the above described method may also be applicable in any other method other than the scanner calibration method above described in relation to FIGS. 1-6. Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. In particular, features presented and described in separate dependent claims may be applied in combination and any combinations of such claims are herewith disclosed.

Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language).

The invention claimed is:

1. Method for calibrating an imaging device, which is configured to generate a first image at a first imaging position and a second image at a second imaging position, for at least partly compensating a misalignment between the first image and the second image, the method comprising
    a) imaging a calibration target at the first imaging position and at the second imaging position, the first image comprising at least a part of the calibration target, thereby forming a first partial target image, and the second image comprising at least a part of the calibration target, thereby forming a second partial target image, wherein the first partial target image comprises a first target component and the second partial target image comprises a second target component associated with the first target component; and
    b) determining a relative position between the first partial target image and the second partial target image for determining at least one misalignment parameter, the step of determining a relative position comprising correlating at least one property of the first target component and the associated second target component,
    wherein the calibration target comprises: a first calibration component, a second calibration component and a third calibration component, the first, second and third calibration components being substantially the same, the first and second calibration components extending along a first direction, the third calibration component being arranged along a second direction, substantially perpendicular to the first direction, with respect to the first and second calibration components, and
    wherein the first image comprises the first calibration component and a first part of the third calibration component, and the second image comprises the second calibration component and a second part of the third calibration component.

2. Method according to claim 1, wherein the imaging device comprises an imaging element array, which array comprises a first imaging element for generating the first image at the first imaging position and a second imaging element for generating the second image at the second imaging position.

3. Method according to claim 2, wherein the first imaging element and the second imaging element are arranged adjacent to each other step a) of the method comprising:
    a1) the first imaging element imaging the first calibration component and a part of the third calibration component;
    a2) the second imaging element imaging the second calibration component and another part of the third calibration component;
    and step b) of the method comprising:
    b1) deriving from the first partial target image a first calibration property based on the first calibration component;

b2) deriving from the second partial target image a second calibration property based on the second calibration component;

b3) deriving from the first and the second partial target image a third calibration property based on the third calibration component;

b4) determining a relative position of the first and second partial target images with respect to each other based on the first, second and third calibration properties.

4. Method according to claim 3, wherein step b4) comprises comparing the third calibration property with an average of the first and the second calibration property and determining a misalignment parameter based on a difference between the third calibration property and said average.

5. Method according to claim 2, wherein the first imaging element and the second imaging element are staggered, step a) of the method comprising:

a3) the first imaging element imaging at least a first part of the calibration target; and a4) the second imaging element imaging at least the first part of the calibration target;

and step b) of the method comprising:

b5) correlating the first partial target image and the second partial target image based on the first part of the calibration target; and b6) determining a relative position of the first and second partial target images with respect to each other based on the correlation.

6. Method according to claim 1, wherein the imaging device comprises an imaging element moveably supported on a guide element for imaging a strip extending in a direction of the guide element, wherein the strip is imaged by generating the first image and the second image at their respective positions, the respective positions arranged on the strip.

7. Method according to claim 6, wherein the first imaging position and the second imaging position are arranged adjacent to each other, step a) of the method comprising:

a5) generating the first image at the first imaging position, the first image comprising the first calibration component and a part of the third calibration component;

a6) generating the second image at the second imaging position, the second image comprising the second calibration component and another part of the third calibration component;

and step b) of the method comprising:

b1) deriving from the first partial target image a first calibration property based on the first calibration component;

b2) deriving from the second partial target image a second calibration property based on the second calibration component;

b3) deriving from the first and the second partial target image a third calibration property based on the third calibration component;

b4) determining a relative position of the first and second partial target images with respect to each other based on the first, second and third calibration properties.

8. Method according to claim 7, wherein step b4) comprises comparing the third calibration property with an average of the first and the second calibration property and determining a misalignment parameter based on a difference between the third calibration property and said average.

9. Method according to claim 6, wherein the first imaging position and the second imaging position are overlapping, step a) of the method comprising:

a7) generating the first image at the first imaging position, the first image comprising at least a first part of the calibration target; and a8) generating the second image at the second imaging position, the second image comprising at least the first part of the calibration target;

and step b) of the method comprising:

b5) correlating the first partial target image and the second partial target image based on the first part of the calibration target; and b6) determining a relative position of the first and second partial target images with respect to each other based on the correlation.

10. A non-transitory computer readable medium comprising computer executable instructions for instructing a computer controlled imaging apparatus to perform the method according to claim 1.

11. Imaging apparatus comprising at least one imaging element, wherein the imaging apparatus is configured to generate a first image at a first imaging position and a second image at a second imaging position, and configured to:

image a calibration target at the first imaging position and at the second imaging position, the first image comprising at least a part of the calibration target, thereby forming a first partial target image, and the second image comprising at least a part of the calibration target, thereby forming a second partial target image, wherein the first partial target image comprises a first target component and the second partial target image comprises a second target component associated with the first target component; and determine a relative position between the first partial target image and the second partial target image for determining at least one misalignment parameter, the step of determining a relative position comprising correlating at least one property of the first target component and the associated second target component, wherein the calibration target comprises: a first calibration component, a second calibration component and a third calibration component, the first, second and third calibration components being substantially the same, the first and second calibration components extending along a first direction, the third calibration component being arranged along a second direction, substantially perpendicular to the first direction, with respect to the first and second calibration components, and wherein the first image comprises the first calibration component and a first part of the third calibration component, and the second image comprises the second calibration component and a second part of the third calibration component.

12. Imaging apparatus according to claim 11, wherein the imaging apparatus further comprises a print engine for providing an image on a recording medium, the print engine being configured to provide a test target on a recording medium, wherein the test target is suitable for use in said calibration method.

13. Imaging apparatus according to claim 12, wherein the print engine comprises a number of inkjet print heads and wherein the imaging apparatus is configured to print the test target using a single print head.

14. Method for calibrating an imaging device, which is configured to generate a first image at a first imaging position and a second image at a second imaging position, for at least partly compensating a misalignment between the first image and the second image, the method comprising a) imaging a calibration target at the first imaging position and at the second imaging position, the first image comprising at least a part of the calibration target, thereby forming a first partial target image, and the second image comprising at least a part of the calibration target, thereby forming a second partial target image, wherein the first partial target image comprises a first target component and the second partial target image comprises a second target component associated with the first target component; and b) determining a relative position between the first partial target image and the second partial target image for determining at least one misalignment parameter, the step of determining a relative position comprising correlating at least one property of the first target component and the associated second target component, wherein the imaging device comprises an imaging element moveably supported on a guide element for imaging a strip extending in a direction of the guide element, wherein the strip is imaged by generating the first image and the second image at their respective positions, the respective positions arranged on the strip, wherein the first imaging position and the second imaging position are arranged adjacent to each other and wherein the calibration target comprises: a first calibration component, a second calibration component and a third calibration component, the first, second and third calibration components being substantially the same, step a) of the method comprising:

a1) generating the first image at the first imaging position, the first image comprising the first calibration component and a part of the third calibration component;

a2) generating the second image at the second imaging position, the second image comprising the second calibration component and another part of the third calibration component;

and step b) of the method comprising:

b1) deriving from the first partial target image a first calibration property based on the first calibration component;

b2) deriving from the second partial target image a second calibration property based on the second calibration component;

b3) deriving from the first and the second partial target image a third calibration property based on the third calibration component;

b4) determining a relative position of the first and second partial target images with respect to each other based on the first, second and third calibration properties, and wherein step b4) comprises comparing the third calibration property with an average of the first and the second calibration property and determining a misalignment parameter based on a difference between the third calibration property and said average.

* * * * *